US011226893B2

(12) United States Patent
Kim et al.

(10) Patent No.: US 11,226,893 B2
(45) Date of Patent: Jan. 18, 2022

(54) COMPUTER PROGRAM FOR PERFORMANCE TESTING OF MODELS

(71) Applicant: MakinaRocks Co., Ltd., Seoul (KR)

(72) Inventors: Ki Hyun Kim, Yongin-si (KR); Jong Seob Jeon, Bucheon-si (KR); Sangwoo Shim, Sokcho-si (KR); Sungho Yoon, Seoul (KR); Hooncheol Shin, Seoul (KR)

(73) Assignee: MakinaRocks Co., Ltd., Seoul (KR)

( * ) Notice: Subject to any disclaimer, the term of this patent is extended or adjusted under 35 U.S.C. 154(b) by 0 days.

(21) Appl. No.: 17/183,019

(22) Filed: Feb. 23, 2021

(65) Prior Publication Data
US 2021/0263839 A1    Aug. 26, 2021

(30) Foreign Application Priority Data
Feb. 24, 2020  (KR) .................. 10-2020-0022501

(51) Int. Cl.
*G06F 9/44*    (2018.01)
*G06F 11/36*   (2006.01)
*G06K 9/62*    (2006.01)

(52) U.S. Cl.
CPC ...... *G06F 11/3688* (2013.01); *G06F 11/3684* (2013.01); *G06F 11/3692* (2013.01); *G06K 9/6256* (2013.01); *G06K 9/6267* (2013.01)

(58) Field of Classification Search
CPC ............. G06F 11/3688; G06F 11/3684; G06F 11/3692; G06K 9/6256; G06K 9/6267
See application file for complete search history.

(56) References Cited

U.S. PATENT DOCUMENTS

| 5,241,620 A * | 8/1993 | Ruggiero ................ G06F 40/18 |
| | | 706/16 |
| 6,965,895 B2 | 11/2005 | Smith et al. |
| 10,002,402 B2 | 6/2018 | Liu et al. |
| 10,489,703 B2 | 11/2019 | Yang et al. |
| 2012/0041989 A1 * | 2/2012 | Banahatti ............ G06F 11/3684 |
| | | 707/804 |

(Continued)

FOREIGN PATENT DOCUMENTS

| KR | 10-2018-0055708 A | 5/2018 |
| KR | 10-1940029 B1 | 1/2019 |

(Continued)

*Primary Examiner* — Hang Pan
(74) *Attorney, Agent, or Firm* — Seed IP Law Group LLP

(57) ABSTRACT

According to an embodiment of the present disclosure for solving the aforementioned problem, disclosed is a computer program stored in a computer-readable storage medium executable by one or more processors, in which when the computer program is executed by one or more processors of a computer device, the computer program allows the one or more processors to perform the following operations for data processing, and the operations may include: an operation of generating a plurality of transformed data based on each of a plurality of data included in a data set; an operation of generating a test data set based on the plurality of data and the plurality of transformed data; and an operation of testing the performance of the model by calculating the test data set by using the model.

16 Claims, 5 Drawing Sheets

(56) References Cited

U.S. PATENT DOCUMENTS

| | | | |
|---|---|---|---|
| 2015/0326597 A1* | 11/2015 | Ciocarlie | G06N 20/00 |
| | | | 726/23 |
| 2015/0379072 A1* | 12/2015 | Dirac | G06N 20/00 |
| | | | 707/693 |
| 2016/0246838 A1* | 8/2016 | Li | G06F 11/3684 |
| 2021/0192322 A1* | 6/2021 | Song | G06N 3/08 |

FOREIGN PATENT DOCUMENTS

| | | |
|---|---|---|
| KR | 10-2101974 B1 | 4/2020 |
| KR | 10-2020-0116831 A | 10/2020 |

\* cited by examiner

COMPUTER PROGRAM FOR PERFORMANCE TESTING OF MODELS

CROSS-REFERENCE TO RELATED APPLICATIONS

This application claims priority to and the benefit of Korean Patent Application No. 10-2020-0022501, filed in the Korean Intellectual Property Office on Feb. 24, 2020, the entire contents of which are incorporated herein by reference.

BACKGROUND

Technical Field

The present disclosure relates to an artificial intelligence technology field, and more particularly, to a computer program for performance testing of an artificial intelligence model.

Description of the Related Art

As sensor data which can be temporarily or permanently stored and used in a database are accumulated, a research is being conducted on automated processing of monitoring data of many industrial equipment. In order to implement a method for judging a state of data, a research on an artificial intelligence technology using an artificial neural network is being conducted.

A deep learning model using the artificial neural network provides a method that can effectively learn a complex non-linear or dynamic pattern, but there is a technical object for a test data building method for testing a learned model.

Korean Patent Application Laid-Open No. KR10-2018-0055708 discloses an image processing method using artificial intelligence.

BRIEF SUMMARY

The present disclosure is contrived in response to the background art and has been made in an effort to provide a computer program for performance testing of an artificial intelligence model.

An embodiment of the present disclosure provides a computer readable medium storing a computer program. The computer program executes the method for testing performance of a model when the computer program is executed by one or more processors of a computer device, and the method may include: generating a plurality of transformed data based on each of a plurality of data included in a data set; generating a test data set based on the plurality of data and the plurality of transformed data; and testing the performance of the model by calculating the test data set by using the model.

Alternatively, generating the plurality of transformed data based on each of the plurality of data included in the data set may include generating the plurality of transformed data by transforming a part of each of the plurality of data.

Alternatively, generating the plurality of transformed data by transforming a part of each of the plurality of data may include selecting a plurality of different data from the data set and an operation of generating the plurality of transformed data by exchanging a value of one data among the plurality of selected data and a value of another data at a predetermined degree.

Alternatively, generating the plurality of transformed data based on each of the plurality of data included in the data set may include generating the plurality of transformed data by processing the data set as an input of a pseudo anomaly generation model.

Alternatively, generating the plurality of transformed data by processing the data set as the input of the pseudo anomaly generation model may include: calculating a first probability distribution and a first sample statistical amount for a first data set by using the first data set and training the pseudo anomaly generation model that learns a second probability distribution and a second sample statistical amount for a second data set, and the first data set and the second data set may include vectors or scalars for homogeneous data.

Alternatively, training the pseudo anomaly generation model may include: calculating a similarity between the first probability distribution and the second probability distribution and determining whether to additionally perform the training of the pseudo anomaly generation model based on the similarity between the distributions.

Alternatively, training the pseudo anomaly generation model may further include: assigning a transformation label to each of the plurality of transformed data and generating a test data set including the plurality of transformed data to which the transformation label is assigned, and the transformation label may include a description of each of the plurality of transformed data, and the transformation label may include at least one of information related to a state of each of the plurality of transformed data or description information related to transformation of each of the plurality of transformed data.

Alternatively, the test data set may include one or more test data subsets, and each of the one or more test data subsets may be constituted by one or more data among a plurality of data included in the data subset of the same class and one or more transformed data among a plurality of transformed data generated based on each of the plurality of data included in the data subset of the same class.

Alternatively, training the pseudo anomaly generation model may further include performing evaluation for the test data set.

Alternatively, performing the evaluation for the test data set may include inputting each of the data included in the test data subset into the model, mapping the input data to a solution space, and an operation of calculating suitability of the test data set based on the data included in the test data subset and a classification reference of the model.

Alternatively, testing the performance of the model by calculating the test data set by using the model may include testing the performance of the model based on whether the model determines that the plurality of transformed data included in the test data set are abnormal.

Alternatively, testing the performance of the model by calculating the test data set by using the model may be performed at at least one time point of learning completion of the model or an operation of the model during learning of the model.

Alternatively, the testing the performance of the model by calculating the test data set by using the model may include testing learning performance of the model by calculating a first test data set by using the model at a predetermined epoch interval in response to a learning time point of the model, testing detection performance of the model by calculating the first test data set by using the model in response to a learning completion time point of the model, and performing testing for performance degradation of the model by calculating a second test data set by using the model in response to an operation time point of the model.

Alternatively, the first test data set includes first test data subsets constituted by different classes, respectively acquired in response to a first time point, and the first test data subset may be constituted by data of one class and transformed data generated based on the data of one class.

Alternatively, the second test data set may include data additionally acquired in response to a second time point which is a time point after the first time point and a second test data subset constituted by transformed data for the data, and the second time point may be a time point corresponding to the operation time point of the model.

Alternatively, performing the testing for the performance degradation of the model by calculating the second test data set by using the model in response to the operation time point of the model may be performed based on whether the model determines that the transformed data included in the second test data subset is abnormal.

Alternatively, performing the testing for the performance degradation of the model by calculating the second test data set by using the model in response to the operation time point of the model may further include: determining that the performance degradation of the model occurs when the model determines that the transformed data included in the second test data subset is normal or determining that the performance degradation of the model does not occur when the model determines that the transformed data included in the second test data subset is abnormal.

Another embodiment of the present disclosure provides a computing device for testing performance of a model. The computing device may include: a processor including one or more cores; a memory including program codes executable in the processor; and a network unit transceiving data with another computing device, in which the processor may generate a plurality of transformed data based on each of a plurality of data included in a data set, generate a test data set based on the plurality of data and the plurality of transformed data, and test the performance of the model by calculating the test data set by using the model.

Still another embodiment of the present disclosure provides a method for testing performance of a model performed by a computing device including one or more processors. The method may include: generating a plurality of transformed data based on each of a plurality of data included in a data set; generating a test data set based on the plurality of data and the plurality of transformed data; and testing the performance of the model by calculating the test data set by using the model.

Yet another embodiment of the present disclosure provides a computer readable medium storing a data structure corresponding to a parameter of a neural network at least partially updated in a learning process. The operations of the neural network may be based on at least partially the parameter, and the learning process may include generating a plurality of transformed data based on each of a plurality of data included in a data set; generating a test data set based on the plurality of data and the plurality of transformed data; and testing the performance of the model by calculating the test data set by using the model.

According to an embodiment of the present disclosure, it is possible to provide a computer program for performance testing of an artificial intelligence model.

BRIEF DESCRIPTION OF THE SEVERAL VIEWS OF THE DRAWINGS

Various aspects are now described with reference to the drawings and like reference numerals are generally used to designate like elements. In the following embodiments, for the purpose of description, multiple specific detailed matters are presented to provide general understanding of one or more aspects. However, it will be apparent that the aspect(s) can be executed without the detailed matters.

DETAILED DESCRIPTION

Figure 1:
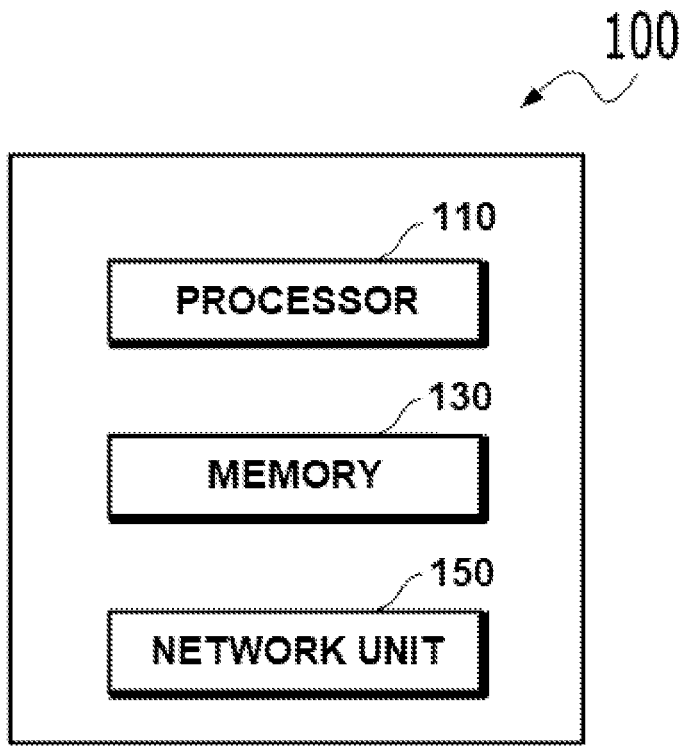
FIG. 1 is a block diagram of a computing device for performing testing of performance of a model according to an embodiment of the present disclosure.

Various aspects are now described with reference to the drawings and like reference numerals are generally used to designate like elements. In the following embodiments, for the purpose of description, multiple specific detailed matters are presented to provide general understanding of one or more aspects. However, it will be apparent that the aspect(s) can be executed without the detailed matters.

FIG. 1 is a block diagram of a computing device for performing testing of performance of a model according to an embodiment of the present disclosure.

Figure 2:
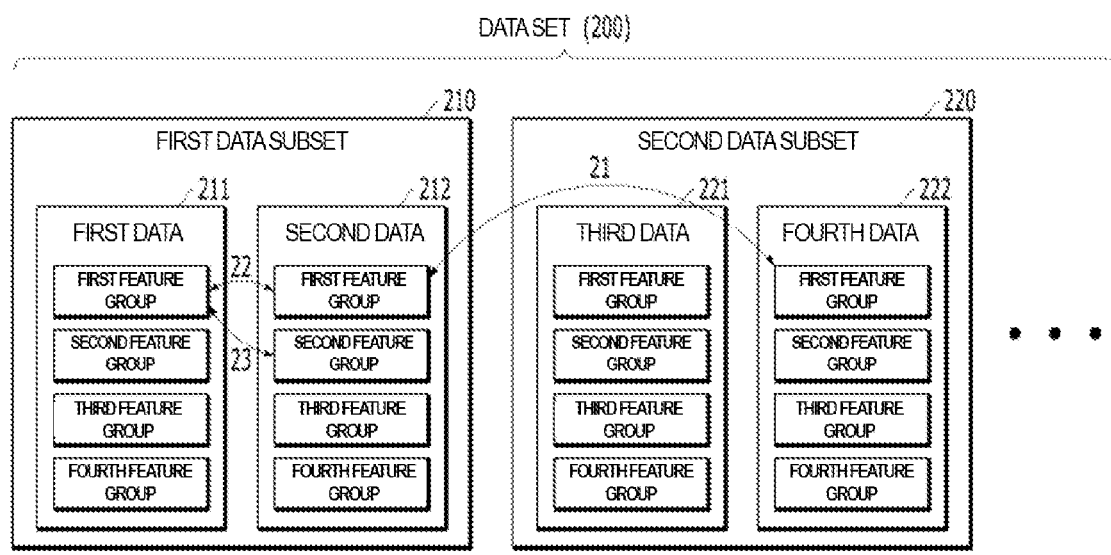
FIG. 2 is a diagram exemplarily illustrating a plurality of data constituting a data set according to an embodiment of the present disclosure.

FIG. 2 is a diagram exemplarily illustrating a plurality of data constituting a data set according to an embodiment of the present disclosure.

Figure 3:
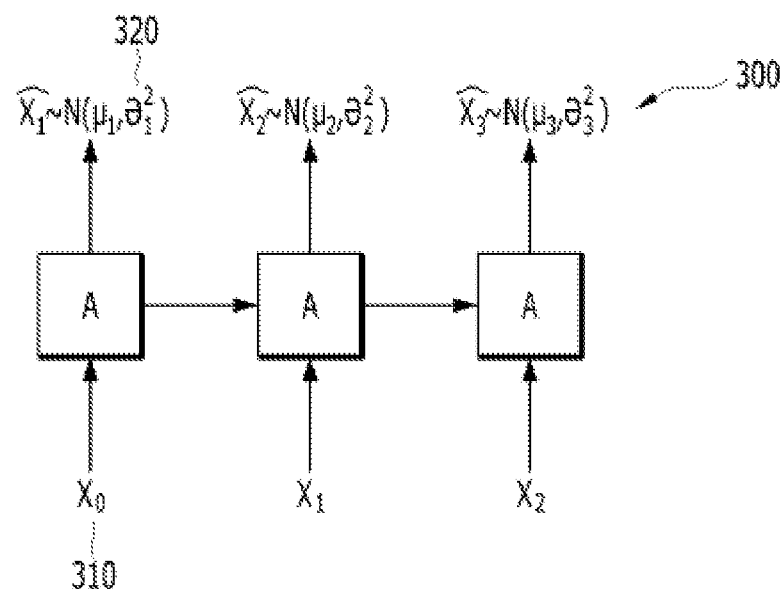
FIG. 3 is a diagram illustrating a recurrent neural network according to an embodiment of the present disclosure.

FIG. 3 is a diagram exemplarily illustrating a recurrent neural network according to an embodiment of the present disclosure.

Figure 4:
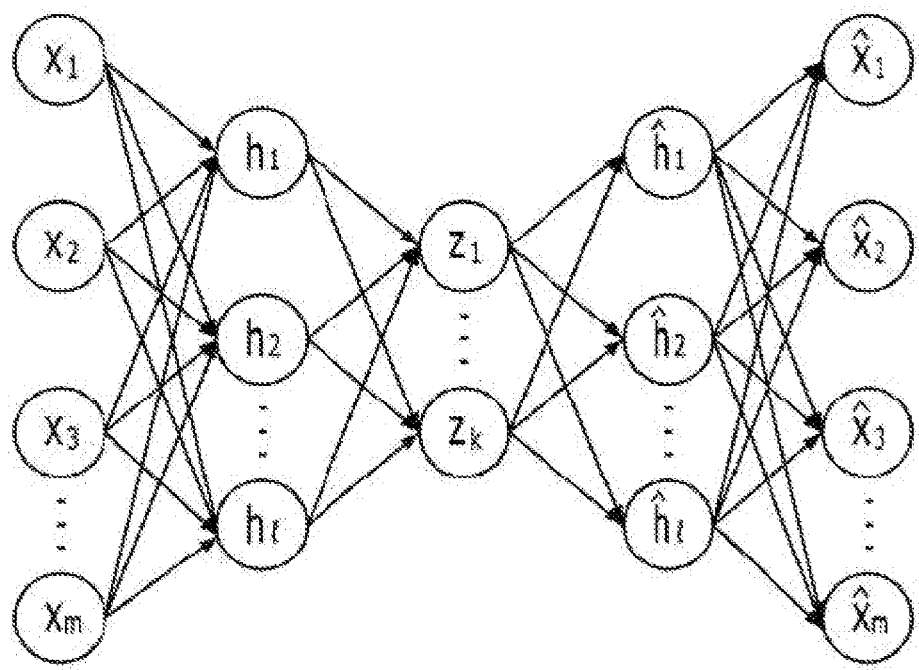
FIG. 4 is a schematic view illustrating a network function according to an embodiment of the present disclosure.

FIG. 4 is a schematic view illustrating a network function according to an embodiment of the present disclosure.

Figure 5:
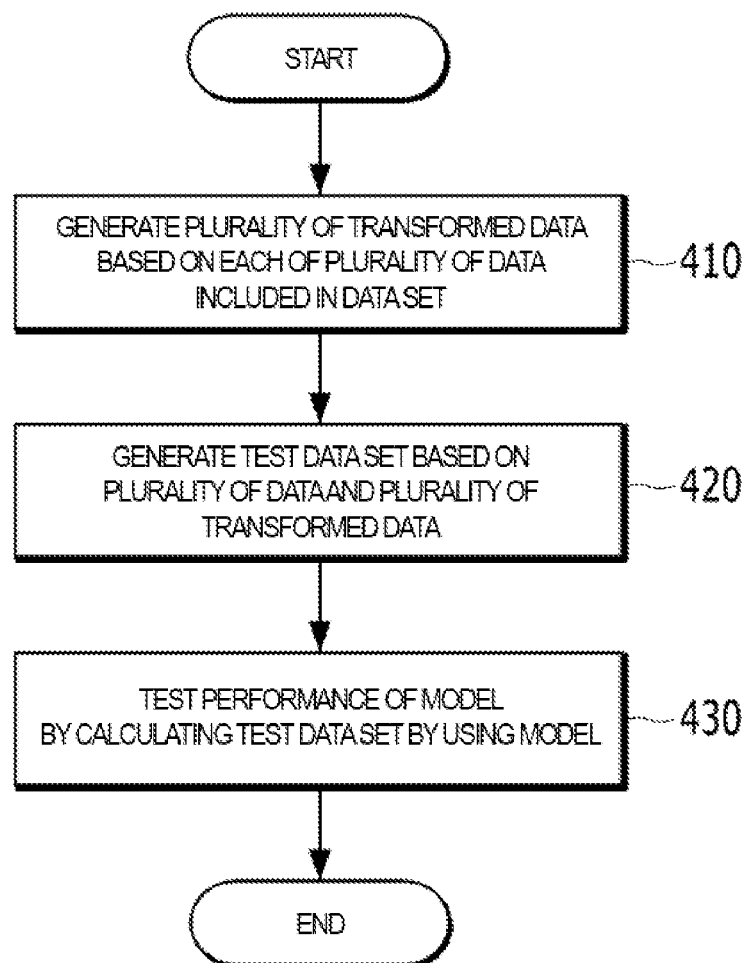
FIG. 5 is a flowchart for performing a method for testing performance of a model according to an embodiment of the present disclosure.

FIG. 5 is a flowchart for performing a method for testing performance of a model according to an embodiment of the present disclosure.

Figure 6:
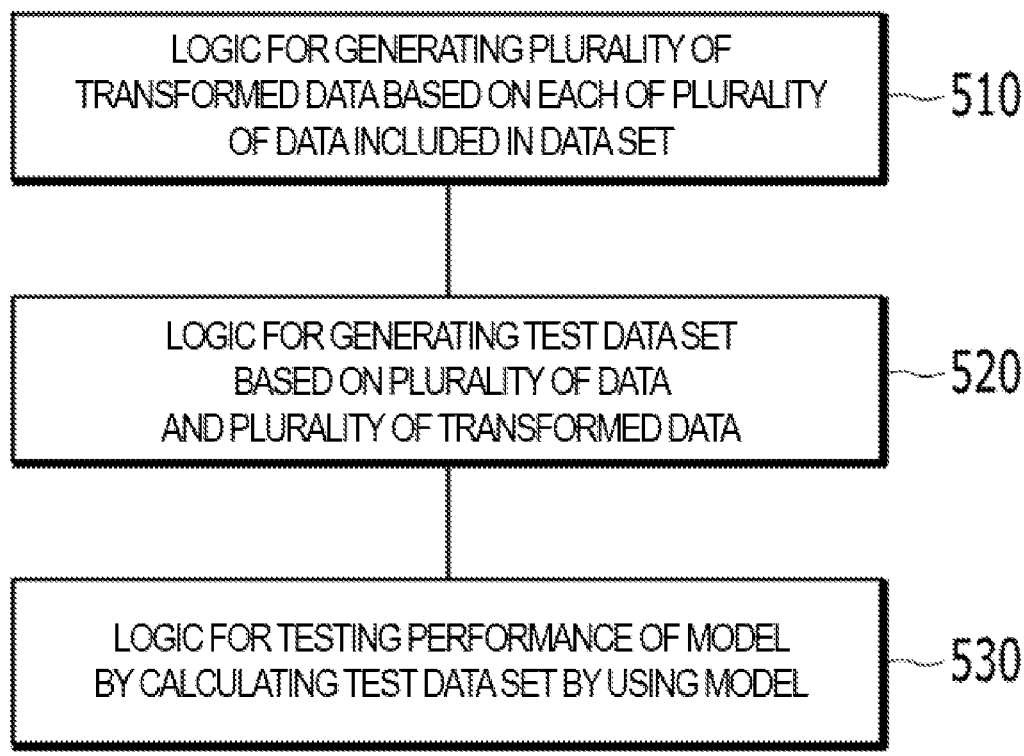
FIG. 6 illustrates a logic for implementing a method for testing performance of a model according to an embodiment of the present disclosure.

FIG. 6 illustrates a logic for implementing a method for testing performance of a model according to an embodiment of the present disclosure.

Figure 7:
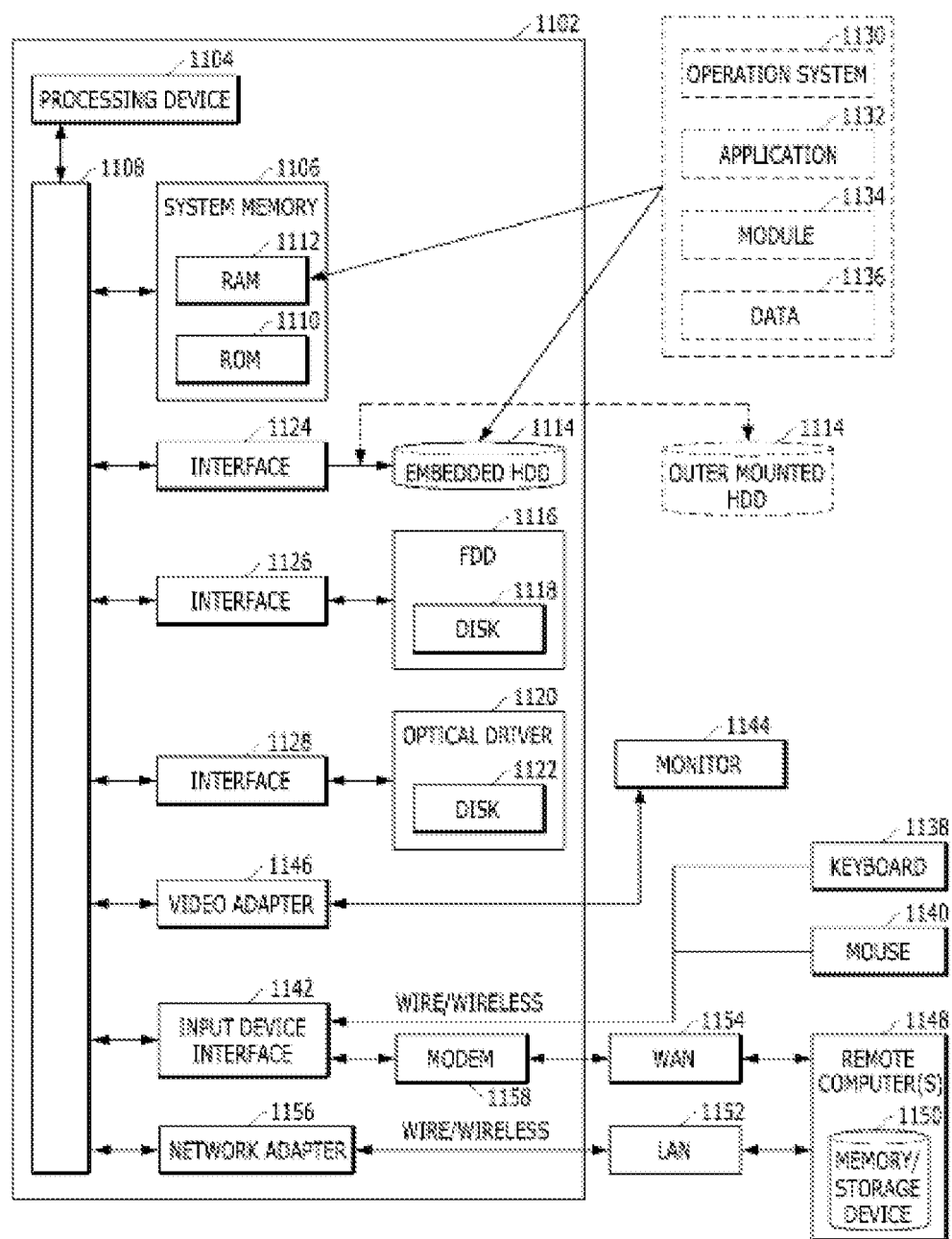
FIG. 7 is a simple and general schematic view of a computing environment in which embodiments of the present disclosure may be implemented.

FIG. 7 is a simple and general schematic view of a computing environment in which embodiments of the present disclosure may be implemented.

MODE OF DISCLOSURE

Various embodiments will now be described with reference to drawings. In the present specification, various descriptions are presented to provide appreciation of the present disclosure. However, it is apparent that the embodiments can be executed without the specific description.

"Component," "module," "system," "unit" and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or." That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

Those skilled in the art need to additionally recognize that various illustrative logical blocks, configurations, modules, circuits, means, logic, and algorithm steps described in connection with the embodiments disclosed herein may be implemented as electronic hardware, computer software, or combinations of both sides. To clearly illustrate the interchangeability of hardware and software, various illustrative components, blocks, constituents, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented embodiments is provided so that those skilled in the art of the present disclosure use or implement the present disclosure. Various transformations to the embodiments will be apparent to those skilled in the art. Generic principles defined herein may be applied to other embodiments without departing from the scope of the present disclosure. Therefore, the present disclosure is not limited to the embodiments presented herein. The present disclosure should be interpreted within the widest range which is coherent with the principles and new features presented herein.

In the present disclosure, a network function and an artificial neural network and a neural network may be used interchangeably.

This application claims priority to and the benefit of the Korean Patent Application No. 10-2018-0080482 filed in the Korean Intellectual Property Office on Jul. 11, 2018, the Korean Patent Application No. 10-2019-0050477 filed in the Korean Intellectual Property Office on Apr. 30, 2019, and the Korean Patent Application No. 10-2019-0067175 filed on Jun. 7, 2019, the entire contents of which are incorporated herein by reference.

FIG. 1 is a block diagram of a computing device for performing testing of performance of a model according to an embodiment of the present disclosure.

A configuration of the computing device 100 illustrated in FIG. 1 is only an example shown through simplification. In an embodiment of the present disclosure, the computing device 100 may include other components for performing a computing environment of the computing device 100 and only some of the disclosed components may constitute the computing device 100.

According to an embodiment of the present disclosure, the computing device 100 may include a processor 110, a memory 130, and a network unit 150.

The processor 110 may be constituted by one or more cores and may include processors for data analysis and deep training, which include a central processing unit (CPU), a general purpose graphics processing unit (GPGPU), a tensor processing unit (TPU), and the like of the computing device. The processor 110 may read a computer program stored in the memory 130 to perform the learning method of the model according to an embodiment of the present disclosure. According to an embodiment of the present disclosure, the processor 110 may perform an operation for learning a neural network model. The processor 110 may perform calculations for learning the neural network, which include processing of input data for learning in deep learning (DN), extracting a feature in the input data, calculating an error, updating a weight of the neural network using backpropagation, and the like. At least one of the CPU, GPGPU, and TPU of the processor 110 may process learning of a network function. For example, the CPU and the GPGPU may together process the learning of the network function and data classification using the network function. In an embodiment of the present disclosure, processors of a plurality of computing devices may be used together to process the learning of the network function and the data classification using the network function. Further, the computer program executed in the computing device according to an embodiment of the present disclosure may be a CPU, GPGPU, or TPU executable program.

In an embodiment of the present disclosure, the computing device 100 may distribute and process a network function by using at least one of the CPU, the GPGPU, and the TPU. Further, in an embodiment of the present disclosure, the computing device 100 may distribute and process the network function together with other computing devices. A description of detailed contents regarding network function distribution processing of the computing device 100 is specifically discussed in U.S. patent application Ser. No. 15/161,080 (filed May 20, 2016) and Ser. No. 15/217,475 (filed Jul. 22, 2016), which are hereby incorporated by reference in their entirety.

The processor 110 may acquire a dataset including one or more data to be trained. In an embodiment of the present disclosure, data processed by using a neural network model may include all kinds of data acquired in an industrial field.

For example, the data may include operating parameters of a device for producing a product in a production process of the product, sensor data acquired by an operation of the device, and the like. For example, temperature setting of equipment in a specific process, a wavelength of a laser in the case of a process using the laser, and the like may be included in the type of data processed in the present disclosure. For example, the processed data may include lot equipment history data from a management execution system (IVIES), data from an equipment interface data source, processing tool recipes, processing tool test data, probe test data, electrical test data, combined measurement data, diagnostic data, remote diagnostic data, post-processing data, and the like and the present disclosure is not limited thereto. As a more specific example, the processed data may include work-in-progress information including approximately 120,000 items for each lot acquired in a semiconductor fab, raw processing tool data, equipment interface information, progress metrology information (e.g., including approximately 1,000 items for each lot), defect information accessible by a yield related engineer, operational test information, sort information (including datalog and bitmap), but the present disclosure is not limited thereto.

In an embodiment of the present disclosure, the computing device 100 may preprocess collected data. The computing device 100 may supplement a missing value among the collected data. The computing device 100 may, for example, supplement the missing value with an intermediate value or an average value or delete a column in which a plurality of missing values exists. Further, for example, the computing device 100 may use a subject matter expertise of a manager in data pre-processing by the computing device 100 for matrix completion. For example, the computing device 100 may remove, from collected data, values (e.g., values estimated as a malfunction of a sensor, etc.) which are completely out of a boundary and a limit. Further, the computing device 100 may adjust a value of the data so as to allow the data to have a similar scale while maintaining characteristics. The computing device 100 may, for example, apply column-based normalization of data. The computing device 100 may simplify processing by removing a column which is not associated with processing of the neural network model from the data. In an embodiment of the present disclosure, the computing device 100 may perform an appropriate input data pre-processing method in order to facilitate learning of the neural network model for generating a classification model and active learning. A description of specific examples regarding types, examples, preprocessing, conversion, etc., of input data is specifically discussed in U.S. patent application Ser. No. 10/194,920 (filed Jul. 12, 2002), which is hereby incorporated by reference in its entirety.

In an embodiment of the present disclosure, the data may include all kinds of data which are acquired in the industrial field as described above. For example, the data may include operating parameters of a device for producing a product in a production process of the product, sensor data acquired by an operation of the device, and the like. One datum may include data acquired while manufacturing a product by using one manufacturing recipe in one manufacturing equipment. The data acquired while manufacturing the product may include sensor data. In other words, a dataset including a plurality of data may include data acquired while manufacturing the product by using one or more manufacturing recipes in one or more manufacturing equipment (in other words, since data regarding multiple manufacturing equipment and multiple manufacturing recipes may coexist, the dataset may have a plurality of normal states), but each data may have one normal state as the data acquired in producing the product by one manufacturing recipe in one manufacturing equipment.

In an embodiment of the present disclosure, the manufacturing equipment may include predetermined manufacturing equipment for producing the product in the industrial field and for example, may include semiconductor manufacturing equipment, but the present disclosure is not limited thereto.

In an embodiment of the present disclosure, the manufacturing recipe may be configured by a method for producing the product in the industrial field and more specifically, the manufacturing recipe may include data for controlling the manufacturing equipment. In an embodiment of the present disclosure, the manufacturing recipe may, for example, include a semiconductor manufacturing recipe loaded to the manufacturing equipment, but the present disclosure is not limited thereto.

The memory 130 may store a computer program for performing the data processing method according to an embodiment of the present disclosure and the stored computer program may be read and driven by the processor 110.

The network unit 150 may transmit and receive data for performing the method for testing the model according to an embodiment of the present disclosure to and from other computing devices, manufacturing devices, servers, and the like. The network unit 150 enables communications among a plurality of computing devices to distribute and process data processing using the neural network model.

The processor 110 may acquire a dataset including one or more data to be trained. As described above, in an embodiment of the present disclosure, the data may include predetermined kind of data acquired in the industrial field, and the processor 110 may acquire data from other computing devices, manufacturing equipment, etc. One or more acquired data may constitute a dataset and the dataset may be a set of data used for computation of one epoch of learning of the neural network model.

Each of the data may be constituted by a plurality of items. Each of the plurality of items may be classified into a feature group according to a predetermined reference. The predetermined reference for classifying the plurality items of the data into the feature group may be an arbitrary reference capable of distinguishing values of the data and another value. Specifically, the feature group may be constituted by associated items among the plurality of items included in the data. For example, the data may be constituted by a plurality of feature groups in which values of the same type are grouped. Further, the data may be constituted by a plurality of feature groups in which values acquired from the same sensor are grouped. Further, the data may be constituted by a plurality of feature groups grouped with values acquired from the same monitoring module.

As a specific example, the data may be constituted by sensor data acquired in a semiconductor production process and a plurality of sensing values for operations parameters of production equipment. The data may be constituted by temperature sensor data, angle sensor data of a first joint, angle sensor data of a second joint, and the like a robot arm. In this case, the temperature sensor data may have a plurality of items when there is a plurality of temperature sensors, for example. In this case, the temperature sensor data may be classified into one feature group. In this case, since values of the temperature sensor data and values of the angle sensor data of the first joint are constituted by different types of values (e.g., different units of values such as a temperature and an angle), the values may be classified into other feature groups. Further, since a value of the angle sensor data of the first joint and a value of the angle sensor data of the second joint are acquired from different sensor or monitoring modules, the values may be classified into other feature groups. That is, the values of the temperature sensor data may be classified into a first feature group, the values of the angle sensor data of the first joint may be classified into a second feature group, and the values of the angle sensor data of the second joint may be classified into a third feature group. In other words, since the types of values are the same as each other or values acquired through the same sensor or monitoring module are data associated with each other, the values may be classified into the same feature group. The concrete description of the temperature sensor data and the joint angle sensor data is just an example and the present disclosure is not limited thereto.

According to an embodiment of the present disclosure, the processor 110 clusters a plurality of data included in a data set to generate a plurality of data subsets which are classified into different classes, respectively. Further, the processor 110 may determine data for performing transformation for some of respective data among the plurality of data. Specifically, the processor 110 may select data which may be used as valid data even after transformation of the data as the data for performing the transformation. Specifically, the processor 110 may select data which may be used as data including an abnormal state as data for performing transformation after transformation of the data.

Referring to FIG. 2, more specifically, the processor 110 may select a plurality of different data from each of the plurality of data subsets classified into different classes as the data for transformation of the data. The processor 110 may select at least one data among data included in a first data subset 210 and select at least one data among data included in a second data subset 220. In this case, each of the first data subset 210 and the second data subset 220 may include information on sensor data acquired at each of time points before and after changing a setting of production equipment. That is, the processor 110 may select first data 211 in the first data subset 210 to be valid as data for learning even after the transformation of the data and to be used as abnormal data after the transformation, and select third data 221 in the second data subset 220.

The processor 110 may select a plurality of different data from data subsets classified into the same class as the data for the transformation of the data. The processor 110 may select the first data 211 and the second data 212 included in the first data subset 210 which is one class as the data for the transformation of the data.

Specifically, referring to FIG. 2, the processor 110 may select the plurality of different data from a data set 200 including a plurality of data constituted by one or more feature groups. For example, the processor 110 may select at least one data among the data included in the first data subset 210 classified into different classes and select at least one data among the data included in the second data subset 220. The data (e.g., the data included in the respective data subsets) included in respective different classes may be data clustered according to the same reference.

As a specific example, the data set including the plurality of data according to the present disclosure may be sensor data, an operation parameter of the production equipment, etc., acquired in a semiconductor production process. In this case, when a setting (e.g., a change of a wavelength of a laser irradiated in a specific process, etc.) of the production equipment is changed in the semiconductor production process (e.g., when there is a change in recipe), the sensor data acquired after the setting change may be included in different data subsets from the sensor data acquired before the setting change. That is, the plurality of data included in the first data subset may be data including the sensor data or information on the operation parameter of the production equipment acquired at the time point before the setting change of the production equipment and the plurality of data included in the second data subset may be data including the sensor data or the information related to the operation parameter of the production equipment acquired at the time point after the setting change of the production equipment. The concrete description of the data included in each of the data subsets is just an example and the present disclosure is not limited thereto. That is, the processor 110 may select the plurality of different data from each of the plurality of data subsets classified into different classes. The processor 110 clusters the data of the data set to generate a plurality of data subsets. The plurality of data subsets may be classified by a classification model trained by using a triplet loss-based cost function, for example.

In other words, the processor 110 clusters the plurality of data included in the data set to generate the plurality of data subsets. For example, the processor 110 may classify the data related to the sensor data acquired at the time point before the setting change of the production equipment or the operation parameter of the production equipment among the plurality of data included in the data set into the first data subset through the trained classification model and classify the data related to the sensor data acquired at the time point after the setting change of the production equipment or the operation parameter of the production equipment into the second data subset.

Accordingly, the processor 110 classifies the plurality of respective data included in the data set into different classes to determine data having different normal patterns as the data for the transformation.

According to an embodiment of the present disclosure, the processor 110 may generate a plurality of transformed data based on each of the plurality of data included in the data set. Modifying some of each of the plurality of data may mean performing transformation of each data by exchanging a value of one data and a value of another data at a predetermined degree. The exchanging of each data at the predetermined degree may mean a degree at which the validity of each data is not damaged after the exchange is performed. Further, the exchange at the predetermined degree may mean data exchange at a degree which makes a lot to learn (e.g., makes it difficult to discriminate).

For example, the plurality of data may include the first data and the second data, and the processor 110 exchanges a value of a part of the first data and a value of a part of the second data to generate the transformed data. In this case, the processor 110 may generate transformed data corresponding to the first data by exchanging 30% of the first data into data corresponding to 30% of the second data. Further, the processor 110 may generate transformed data corresponding to the second data by exchanging 20% of the second data into data corresponding to 20% of the first data. Further, the processor 110 exchange data corresponding to 10% among the data included in the first data and the second data, respectively to generate the transformed data corresponding to the first data and the second data, respectively.

That is, the processor 110 may determine exchange degrees of the plurality of respective data to be different from each other or to be the same as each other so as to prevent the validity of each data from being damaged or to make it difficult to discriminate during a process of generating the transformed data by exchanging a part of each of the plurality of data.

The processor 110 may exchange a value of one feature group among one or more feature groups of one data among the plurality of data and a value of one feature group among one or more feature groups of another data. The processor 110 may exchange values of data which belong to the same feature group of each data with each other. The processor 110 may exchange a value of the first feature group of the first data and a value of the first feature group of the second data with each other. For example, the processor 110 may exchange values of an angle sensor feature group of the first joint of the first data and values of the angle sensor feature group of the first joint of the second data with each other. That is, by exchanging values of feature groups associated with each other, respective transformed data may become data which itself is valid, but includes an abnormal state. For example, when values of feature groups which are not associated with each other at all are exchanged with each other in two or more data, there is a possibility that the data itself will not be valid and the data itself may be determined as the abnormal data. That is, for example, when values of the feature group related to an operating temperature included in the first data are exchanged with values of the feature group related to an operating time included in the second data, the data is not valid, and as a result, the data itself may be determined to be abnormal and thus may not be suitable for learning of the model. In other words, data in which values of different feature groups are exchanged may be data not requiring a lot of classification performance of the model. However, the values included in the associated feature groups are exchanged with each other, and as a result, the data which itself is valid, but is not in the normal state may be generated. In other words, the data is generated by exchanging the values included in the associated feature groups to generate data which is the abnormal data, but requires a lot of classification performance of the model. That is, data having a lot of knowledge which the model is to learn may be generated.

A feature group selected from data included in different classes for exchange may be the associated feature group. For example, the feature group selected for exchange may be a common item in the data included in different classes. For example, when both data are data related to a motion of the same robot arm, the feature group may correspond to each joint of the robot arm. In this case, the processor 110 may exchange values of feature groups related to the same joint, for example.

The associated feature group may be selected to generate valid data when the values of each feature group are exchanged in both data. For example, the feature group selected from each data for exchange may be a feature group in which the types of value and validity included in the corresponding feature group correspond to each other. For example, when both data are data related to the motion of the same robot arm, the feature group may be each joint of the robot arm.

In another example, the associated feature group may be selected as a feature group in which a state of data may be changed when the values of each feature group are exchanged in both data. In this case, as described above, the feature group may be selected so that the data are valid before and after the exchange. For example, when both data are data related to the motion of the same robot arm, the feature group may be each joint of the robot arm. Further, the processor 110 may exchange values of feature groups related to different joints, for example. That is, the processor 110 may exchange a value of a feature group related to the first joint in the first data and a value of a feature group related to the second joint in the second data with each other. In this case, both the values of the feature group related to the first joint and the values of the feature group related to the second joint may include values related to a motion angle of the joint, and even though data are generated by exchanging the values of the feature group in such a scheme, the data may have a valid form. The aforementioned description is just an example and the present disclosure is not limited thereto.

As still another example, the processor 110 may exchange values of feature groups related to different joints. By exchanging the values of the feature groups related to different joints, when data before exchange is normal state data, data after exchange may be in an abnormal state. Further, values of corresponding feature groups may be exchanged in each data. However, in this case, since the state of the data may not be changed according to values included in different feature groups, when the processor 110 exchanges the corresponding feature group for learning, the processor 110 may select the feature group so that the state of the data is changed.

Referring to FIG. 2, more specifically, the processor 110 may select a plurality of different data from each of the plurality of data subsets classified into different classes. The processor 110 may select at least one data among data included in a first data subset 210 and select at least one data among data included in a second data subset 220. In this case, each of the first data subset 210 and the second data subset 220 may include information on sensor data acquired at each of time points before and after changing a setup of production equipment. When the second data 212 is selected from the first data subset 210, and the fourth data 222 is selected from the second data subset 220, the processor 110 may change a value of one feature group among one or more feature groups included in each of the second data 212 and the fourth data 222. The processor 110 exchanges a value of a first feature group among a plurality of feature groups included in the second data 212 and a value of a first feature group among a plurality of feature groups included in the fourth data 222 (21) to modify the value of each feature group. That is, the processor 110 selects data included in each data subset forming a different class, and exchanges values of data belonging to the same feature group of each selected data to perform transformation of a part of each of the plurality of selected data. In this case, the transformation of each of the selected data may be performed by exchanging the values of the data belonging to the same feature group (e.g., exchanging data values having an association).

The processor 110 may select two or more data included in the same data subset and change values thereof. For example, the processor 110 selects the first data 211 and the second data 212 included in the first data subset 210 and exchanges data of the first feature group of the first data 211 and the first feature group of the second data 212 with each other (22) to generate new data. In addition, in this case, the generated data may be normal or abnormal according to values included in other feature groups. In the aforementioned example, the first data 211 in which the value of the first feature group is changed to the value of the first feature group of the second data 212 is normal data or the abnormal data according to values included in the second and third feature groups.

As another example, the processor 110 selects the first data 211 and the second data 212 included in the first data subset 210 and exchanges the first feature group of the first data 211 and the second feature group of the second data 212 with each other (23) to generate new data. In this case, the first feature group of the first data 211 may be a feature group constituted by values related to angle sensing data of the first joint, and the second feature group of the second data 212 may be a feature group constituted by values related to the angle sensing data of the second joint. For example, when the first joint and the second joint have a similar specification and motion ranges of the first and second joints correspond to each other, the valid data may be generated. That is, the data is transformed through the exchange (23) between feature groups (e.g., feature groups constituted by values related to angle sensing data of the joint) which are not completely identical, but have the association, and as a result, the data is highly likely to be valid and the data may be transformed to data including the abnormal state.

Accordingly, as a result of performing a motion in which the processor 110 selects a plurality of data and exchanges values of feature groups of each data, the normal data included in each data may be transformed into the abnormal data. Further, since the data transformed by the processor 110 is not generated through an exchange of normal data including completely different manufacturing recipes, but is an exchange of respective normal data having the association in the same feature group, the corresponding data may be used as data for testing a neural network model. That is, the processor 110 may generate abnormal data for testing a model through transformation of each of the plurality of data.

According to another embodiment of the present disclosure, the processor 110 may generate a plurality of transformed data by processing a data set including a plurality of data as an input of a pseudo anomaly generation model. The pseudo anomaly generation model may be a model that is constituted by a recurrent neural network (RNN) and trains a probability distribution of output data. The pseudo anomaly generation model may be a model that trains characteristics of data through the data and derives a probability distribution of the data as an output. The pseudo anomaly generation model may generate data similar to learning data based on the derived probability distribution. That is, the transformed data generated through the pseudo anomaly generation model may mean abnormal data artificially generated based on input data.

The recurrent neural network has a characteristic that a connection between units has a recurrent structure. Such as structure makes it possible to store a state in a neural network so as to model a time-varying dynamic feature. Unlike a forward delivery neural network, the recurrent neural network may process a sequence type input by using an internal memory. Accordingly, the recurrent neural network may process data having time-varying characteristics such as handwriting recognition, speech recognition, and time-series sensor data. The description of the aforementioned data is just an example and the present disclosure is not limited thereto. In the present disclosure, input data 310 processed as an input into the recurrent neural network may be sequence data, and output data 320 related to the output of the recurrent neural network as a result derived while the input data passes through the neural network may be data expressing the probability distribution.

For example, the output data 320 may include a form (e.g., normal distribution) of a distribution and a parameter (e.g., mean) of a first data set or a test data set derived by the neural network.

Referring to FIG. 3, when the input data 310 is input into the recurrent neural network, the output data 320 may be calculated as a result of the input. As illustrated in FIG. 3, when a neural network 300 takes the form of the recurrent neural network, a unit of the recurrent neural network may affect the calculation of a next unit.

For example, it is assumed that the output data 320 represents a probability distribution for a temperature detected by a sensor at a specific time point. When the temperature at the previous time point is input to the recurrent neural network as the input data 310, the output data 320 may represent the probability distribution of the temperature at the specific time point. In this case, the probability distribution may be expressed by using data of the type of distribution (e.g., normal distribution) and parameters thereof (e.g., mean and standard deviation of the distribution).

The recurrent neural network may be generally suitable for modeling sequence/time series data. Accordingly, the input data 310 and the output data 320 may be related to text or voice sentences, temperature data over time, and the like. This is only an example of the type of sequence/time series data, and the type of sequence/time series data is not limited thereto.

That is, it is assumed that the input data 310 and the output data 320 are image data. In this case, specific image data (e.g., MNIST data) may be converted into sequence data, and as a result, the input data 310 and the output data 320 may be related to the image data. Since the aforementioned contents are just examples for the types of input data and output data, the input data and the output data are not limited to the aforementioned examples.

The processor 110 may calculate a first probability distribution for the first data set and a first sample statistical amount of the first probability distribution. The first probability distribution may correspond to the output data 320 in FIG. 3. The first probability distribution may be used to determine a similarity with a second probability distribution derived from the pseudo anomaly generation model to be generated later, or to determine whether the probability distribution derived from the pseudo anomaly generation model is statistically significant. The first data set may be constituted by data randomly extracted from the existing data set. For example, the first data set may be constituted by data extracted to maintain characteristics of the existing data set.

More specifically, the processor 110 may derive the first probability distribution through the recurrent neural network trained by the first data set. That is, the first probability distribution may be a distribution related to the first data set. The first probability distribution may be expressed by the form of the distribution and the first sample statistical amount of the first probability distribution. A sample statistical amount may include, for example, a mean, a standard deviation, a mode, a median, etc., of the probability distribution. This is just an example for the sample statistical amount and the form of the sample statistical amount is not limited thereto.

The processor 110 may train the pseudo anomaly generation model that trains a second probability distribution for the second data set and a second sample statistical amount of the second probability distribution. The second data set may include homogeneous data to the first data set. The first data set and the second data set may be vectors or scalars for the homogenous data. That is, when the first data set is a set of temperature data detected by the sensor for a predetermined time period, the second data set may also be a set of temperature data detected by the sensor for the same time period. The first data set and the second data set may or may not share some or all of the data.

The second probability distribution, as a probability distribution learned by the pseudo anomaly generation model using the second data set as the test data set, may be an example of the output data 320 of FIG. 3.

That is, when the pseudo anomaly generation model is, for example, the recurrent neural network of FIG. 3, the output data 320 may be the second probability distribution. In this case, the second probability distribution may be expressed by the form of the distribution and the second sample statistical amount.

As described above, the second sample statistical amount may include a mean, a standard deviation, a mode, a median, etc., of the second probability distribution. However, this is just an example for the second sample statistical amount and the form of the second sample statistical amount is not limited thereto.

Accordingly, for example, when the second data set is temperature data of an apparatus detected by a sensor during a specific time period, the pseudo anomaly generation model may learn a probability distribution of temperature values of the apparatus over time. Once the probability distribution is learned, the processor 110 may generate the temperature value of the apparatus over time based on the learned probability distribution. The transformed data according to the present disclosure may mean abnormal data artificially generated based on the input data.

As described above, after learning the probability distribution of the existing collected data set, the transformed data may be generated based thereon. Therefore, transformed data similar to a pattern of actual data may be generated as compared with the abnormal data which is randomly generated.

In other words, the transformed data generated through the pseudo anomaly generation model may include multiple transformed data close to the normal data. That is, the pseudo anomaly generation model may generate data (e.g., data having a lot of knowledge which the model is to learn) requiring a lot of classification performance of the model (e.g., anomaly detection model). Therefore, the pseudo anomaly generation model may more accurately train a classification reference between the normal data and the abnormal data. Further, the processor 110 may calculate the similarity between the first probability distribution and the second probability distribution. In regard to the first data, the first probability distribution and the first sample statistical amount according to the present disclosure may correspond to the output data 320 derived by the recurrent neural network trained by the first data set. Further, the second probability distribution according to the present disclosure as a probability distribution derived by the pseudo anomaly generation model trained from the second data set may correspond to the output data 320 of FIG. 3.

A degree of similarity between distributions according to the present disclosure may be defined as a value obtained by quantifying the similarity between two probability distributions. A concrete definition of the degree of similarity between distributions may vary depending on a derivation scheme.

For example, the processor 110 may calculate the similarity degree between distributions based on a difference in mean and standard deviation value between two probability distributions. Alternatively, the processor 110 may use Kullback-Leibler divergence (KLD) to calculate the similarity degree between distributions. However, since this is just an example of a method of calculating the degree of similarity between distributions, a method of calculating the degree of similarity between distributions is not limited thereto.

As the degree of similarity between the first probability distribution and the second probability distribution increases, the test data set generated by the pseudo anomalous data set may become similar to the first data set. As the degree of similarity between the first probability distribution and the second probability distribution decreases, the difference between the data included in the test data set generated by the pseudo anomalous data set and the data included in the first data set may be larger.

The processor 110 may determine whether the degree of similarity is equal to or more than a preset reference. When the degree of similarity is not equal to or more than the preset reference, the processor 110 may additionally perform training of the pseudo anomaly generation model.

A goal of the pseudo anomaly generation model according to the present disclosure is to better generate anomalous data close to the classification reference, e.g., similar to the normal data. Accordingly, in some embodiments, the processor 110 may maintain the degree of similarity between the probability distribution derived from the pseudo anomaly generation model and the first probability distribution at an appropriate level.

Therefore, in training the pseudo anomaly generation model, if the degree of similarity between the second probability distribution and the first probability distribution derived from the current pseudo anomaly generation model is equal to or more than a preset reference, training may be performed no longer. By such a scheme, it is possible to prevent the result that the pseudo anomaly generation model is overtrained so that the first probability distribution and the second probability distribution become the same.

On the contrary, when the degree of similarity does not meet the preset reference, it may be necessary to additionally perform the training of the pseudo anomaly generation model. When the degree of similarity is equal to or more than the preset reference, the processor 110 may terminate the training of the pseudo anomaly generation model. The aforementioned preset reference may vary depending on a field to which the pseudo anomaly generation model is applied is applied, a data format, a data type, and the like according to the present disclosure.

The processor 110 may determine the sample statistical amount of the probability distribution derived from the pseudo anomaly generation model for which training is terminated as the second sample statistical amount. As described above, the second sample statistical amount may include a mean, a standard deviation, a mode, a median, etc., of the second probability distribution. However, this is just an example for the second sample statistical amount and the form of the second sample statistical amount is not limited thereto.

As described above, the processor 110 may obtain a plurality of second sample statistical amounts meeting the preset reference. Therefore, the processor 110 may evaluate the test data set generated based on each of the second sample statistical amounts by a method to be described later. The test data is generated from the pseudo anomaly generation model that generates the most appropriate anomalous data based on the evaluation to more effectively perform training of the model.

According to an embodiment of the present disclosure, the processor 110 clusters a plurality of transformed data to generate a plurality of transformed data subsets which are classified into different classes, respectively. Specifically, the processor 110 clusters the plurality of transformed data based on a plurality of data associated with transformation of each of the plurality of transformed data to generate the plurality of transformed data subsets. The processor 110 may generate the plurality of transformed data subsets by clustering the plurality of transformed data based on which data subset each of the plurality of data associated with the transformation of each of the plurality of transformed data is included in and which part of the plurality of corresponding data is transformed.

For example, when the plurality of transformed data includes first transformed data and second transformed data, and respective transformed data are generated based on each of the first data included in the first data subset and the second data included in the second data subset, respectively, the processor 110 may generate a first transformed data subset and a second transformed data subset including the first transformed data and the second transformed data, respectively based on the data (e.g., the first data and the second data) associated with the transformations of the respective transformed data, respectively. As another example, when the plurality of transformed data includes third transformed data, fourth transformed data, and fifth transformed data, and transformation of the third transformed data is the transformation corresponding to the first feature group in the third data, transformation of the fourth transformed data is the transformation corresponding to the first feature group in the fourth data, and transformation of the fifth transformed data is the transformation corresponding to the second feature group in the fifth data, the processor 110 clusters to the corresponding transformed data to generate a third transformed data subset including the third transformed data and the fourth transformed data, and a fourth transformed data subset including the fifth transformed data. That is, the processor 110 may make data having the same transformed part (e.g., specific feature group) among the transformed data based on the data associated with the transformation of the transformed data to be included in the same transformed data subset, and make data having different transformed parts to be included in different data subsets. The concrete description of the aforementioned data and transformed data is just an example and the present disclosure is not limited thereto.

According to an embodiment of the present disclosure, the processor 110 may grant a transformation label to each of the plurality of transformed data. Specifically, the processor 110 selects a plurality of data from a plurality of data subsets forming different classes, respectively and exchanges values of data belonging to the same feature group of each selected data with each other to generate data (data related to abnormality) transformed through transformation of a part of each of the plurality of selected data. Further, the processor 110 may generate the plurality of transformed data by processing each of the plurality of data subsets forming different classes as the input of the pseudo anomaly generation model.

The processor 110 may grant the transformation label to each of the generated transformed data. The transformation label may be a hard label or a soft label.

The transformation label includes a description of each of the transformed data, and may include at least one of information related to the state of the transformed data or description information related to the transformation of the transformed data.

The transformation label may be, for example, a label indicating that the corresponding data is abnormal, a label including description information indicating that a specific feature value of the corresponding data is abnormal, and may indicate a probability that the corresponding data will be abnormal (for example, a value obtained by considering the weight of the changed feature group in the data, etc.). The aforementioned description is just an example and the present disclosure is not limited thereto.

For example, the processor 110 may select first data and second data from a data set including a plurality of data, and exchange a specific feature group of each of the first data and the second data with each other. In this case, since the first data includes a value of the specific feature group of the second data and the second data includes a value of the specific feature group corresponding to the first data, each of the transformed data may be abnormal data. In this case, the processor 110 may grant the transformation label to each data. The concrete description of the process of generating the abnormal data through each data described above is just an example and the present disclosure is not limited thereto.

That is, the processor 110 grants the transformation label to each of the transformed data (e.g., each of the abnormal data) by exchanging the specific feature group included in each of the plurality of data to allow a model to detect whether the corresponding data is abnormal during a testing process.

In general, a neural network model for detecting whether the corresponding data is anomalous based on specific data may be pre-trained through learning data including normal data and abnormal data. In other words, in some embodiments, in the process of pre-training the neural network model to detect whether the corresponding data is anomalous, it may be necessary to construct both the normal data and the abnormal data. However, since abnormal data for training the neural network includes information on a time series, it is difficult to obtain (or build) the abnormal data, and a lot of time may be required to construct the corresponding abnormal data. In the present disclosure, since data is transformed by exchanging the same feature group of each of the normal data with each other to generate the abnormal data, separate abnormal data need not be constructed, and as a result, it may be easy to construct the learning data. Further, the abnormal data generated by transforming the plurality of data of the present disclosure is made not by simply transforming a partial region of each data (for example, adding some noise to specific data) to a different value but through exchange of values of data belonging to the same feature group (e.g., exchange of data values having an association) or is made through learning of the probability distribution of the existing collected data set and then utilization of the pseudo anomaly generation model that generates transformed data close to the normal data based on the trained probability distribution. Therefore, learning data (e.g., data requiring a lot of classification performance) may be generated, which is suitable for learning of the neural network (e.g., anomaly detection model).

According to an embodiment of the present disclosure, the processor 110 may generate a test data set based on a plurality of data and a plurality of transformed data. The test data set generated by the processor 110 may include one or more test data subsets constituted by different classes, respectively. In this case, one or more test data subsets may be constituted by one or more data among a plurality of data included in the data subset of the same class and one or more transformed data among a plurality of transformed data generated based on each of the plurality of data included in the data subset of the same class.

In detail, the processor 110 may generate a test data set including a plurality of test data subsets based on information on the classes of each of the plurality of data and the plurality of transformed data. For example, when the plurality of data includes first data which is classified into a first class and included in a first data subset and second data which is classified into a second class and included in a second data subset and the plurality of transformed data includes first transformed data which is classified into the first class and included in a second transformed data subset and second transformed data which is classified into the second class and included in a second data subset, the processor 110 may generate a first test data subset including the first data and the first transformed data which each are classified into the same class and generate a second test data subset including the second data and the second transformed data.

As another example, when a plurality of data included in a third data subset classified into a third class includes third data, fourth data, and fifth data and a plurality of transformed data included in a third transformed data subset classified into the third class includes third transformed data and fourth transformed data, the processor 110 may generate a test data subset including the third data, the fourth data, the fifth data, the third transformed data, and the fourth transformed data. The concrete description of classes of the aforementioned data and transformed data is just an example and the present disclosure is not limited thereto.

That is, the processor 110 may constitute each test data subset by the data and transformed data of the same class. In other words, each test data subset may include a plurality of data corresponding to the normal data and transformed data related to abnormality generated as some of the plurality of data are transformed.

The processor 110 may generate a test data set including test data subsets of a predetermined number or more. Specifically, the processor 110 may generate test data subsets of a predetermined number or more during a process of generating test data subsets of different classes, respectively through the data and transformed data of the same class. The predetermined number related to the test data subset may mean a reference for generating a test data set showing the same feature as learning data related to learning of the model. For example, as classes of a plurality of data of a data set related to learning are clustered into 20 classes, the plurality of data are classified into first to $20^{th}$ data subsets and when a predetermined number which becomes a reference for generating a test data subset that entirely reflects the feature of the data related to the corresponding learning is 18, the processor 110 may generate 18 or more test data subsets which are in different classes, respectively through the data and transformed data of the same class. Therefore, the processor 110 may generate a test data set representing overall features of the learning data related to the learning of the model. That is, it may be possible to generate test data set suitable for testing of the model.

According to an embodiment of the present disclosure, the processor 110 may perform evaluation for the test data set. Specifically, the processor 110 may input each of the data included in the data subset into the model and map the input data to a solution space. In the present disclosure, the solution space may include a space in which data may be mapped to a representation in which predetermined processing for the input data is performed and for example, may include a space to which the data processed by the classification model may be mapped or a space to which a dimension reduction representation or the vector representation of the input data may be mapped. In the present disclosure, a data space may include a space to which the input data may be mapped.

The processor 110 may evaluate the suitability of the test data set based on a distance between each of the mapped data and the classification reference of the model. The evaluation of the suitability of the test data set may be based on a distance between each of the data included in the data subset and the classification reference. For example, the processor 110 may calculate an average value of the distance between each of the data and the classification reference, and evaluate that the suitability of the test data set is lower as the average value of the distance decreases. As another example, the processor 110 may calculate a dispersion index of the distance value between each data and the classification reference. Here, the dispersion index may be expressed as a distribution or standard deviation of the distance value. The processor 110 may evaluate the suitability of the test data set higher as the dispersion value is lower.

As still another example, the processor 110 may calculate the density of the test data included in the test data set. In this case, for example, the processor 110 may calculate reciprocals of the average value of the distance, the dispersion, and the density as the suitability. Since the aforementioned contents are just examples of determining the suitability of the test data set, the method for calculating the suitability of the test data set is not limited thereto.

When evaluation for the plurality of test data sets is performed, the processor 110 may finally generate the test data set by using a sample statistical amount associated with the test data set with the highest suitability and a pseudo anomaly generation model that generates a probability distribution related thereto.

The closer the data is to the classification reference, the more helpful it is to train the classification reference of the neural network. Therefore, if the data included in an arbitrary data set are close to the classification reference on average, the data set may be suitable for learning the neural network. In addition, when comparing two data sets having an average distance of substantially the same range, a case where the data are dense may be a case suitable for learning the classification reference. The reason is that when the data are distributed over a wide range, learning may be difficult because the classification reference is ambiguous.

Accordingly, when the suitability of the test data set is determined based on the distance from the classification reference of the data included in the subset, the dispersion of the distance, and the density of the test data, it may be possible to effectively evaluate the suitability of the test data set.

According to an embodiment of the present disclosure, the processor 110 may test the performance of the model by calculating the test data set by using the model. In an embodiment of the present disclosure, the model may be used for anomaly detection. Specifically, the processor 110 may test the performance of the model based on whether the model determines that the plurality of transformed data included in the test data set is abnormal. In addition, the processor 110 may test the performance of the model based on whether each of one or more feature groups which is determined to be abnormal in each of the plurality of transformed data by the model is included in one or more feature groups related to transformation in each of the plurality of transformed data.

For example, the processor 110 may perform transformation for the first data and the second data by exchanging some of a plurality of feature groups included in the first data and the second data, respectively with each other. Further, the processor 110 may output whether each data is anomalous by setting each of the first transformed data and the second transformed data (e.g., data related to abnormality) as the input of the model. When an output result of the model includes information indicating that anomaly is detected in the first transformed data and includes information indicating that the anomaly is detected in the second transformed data, the processor 110 may determine that the performance of the corresponding model is appropriate. For example, when the model calculates an output (e.g., a correct answer rate) that the anomaly is detected for inputs of the plurality of transformed data at a predetermined ratio (e.g., 90%) or more, it may be determined that the performance of the corresponding model is appropriate.

As another example, when the output result of the model includes information indicating that the anomaly is not detected in at least one data of the first transformed data or the second transformed data, the processor 110 may determine that the performance of the corresponding model is not appropriate.

As still another example, the processor 110 may perform transformation for the first data and the second data by exchanging the first feature groups among the plurality of feature groups included in the first data and the second data, respectively with each other. Further, the processor 110 may output whether each data is anomalous by setting each of the transformed first and second data (e.g., data related to abnormality) as the input of the model. When the output result of the model includes information indicating that the anomaly is detected in each of the transformed first and second data, and includes information indicating that the first feature group in the transformed first data is related to the anomaly and information indicating that the second feature group in the transformed second data is related to the anomaly, the processor 110 determines that the determination of whether the anomaly is detected in the second transformed data is not appropriate to determine that the performance of the corresponding model is not appropriate because the part of the second transformed data related to the anomaly is the first feature group. A concrete description of the determination for whether the anomaly is detected output based on the first data and the second data described above is just an example, and the present disclosure is not limited thereto.

That is, it may be possible to test the performance of the neural network model trained in an environment in which the test data set is not constructed. In other words, even without constructing a separate test set for testing the trained neural network model, it is possible to perform the test for the trained neural network model by generating abnormal data through transformation of a plurality of data.

As a result, since it is not necessary to construct the separate test set, learning and performance testing of the neural network are simplified, and efficiency of generating the neural network model (e.g., an anomaly detection model) for detecting the anomaly may be enhanced.

According to an embodiment of the present disclosure, the processor 110 may test the performance of the model in response to at least one time point of model learning, model learning completion, or model operation. Specifically, the processor 110 may test learning performance of the model by calculating the test data set by using the model at an epoch interval predetermined in response to the learning time point of the model. Learning the data set for learning once by the neural network may be one epoch. For example, when the predetermined epoch interval is 2, the processor 110 calculates the test data set by using the model every 2 epochs in the process of learning the model to test the learning performance of the model. In this case, according to an embodiment of the present disclosure, the model may be an anomaly detection model and may be a model learned through an unsupervised learning method and for detecting whether the anomaly is detected. The data set for the learning of the corresponding model may include only the normal data. As a result, in some embodiments, it is necessary to construct a test data set including the abnormal data as well as the normal data in order to determine whether learning the model is well performed in the process of learning the model. Therefore, the processor 110 generates transformed data through transformation (e.g., exchanging some values of a plurality of different data, or outputting abnormal data similar to input data through the anomaly generation model) of the data set through the aforementioned method and processes test data including the generated transformed data as the input in response to a learning time point of the model to determine whether the learning of the model is appropriate.

The processor 110 may test detection performance of the model by calculating the test data set by using the model in response to a learning completion time point of the model. Specifically, the processor 110 may output a result of whether the anomaly is detected by processing the test data set as the input to the model for which learning is completed, and test the detection performance based on the output result. The processor 110 may output whether the anomaly is detected for each of the plurality of test data included in the test data set by processing the test data set including the plurality of data and the plurality of transformed data transformed based on the plurality of data as the input to the model for which learning is completed at the time point when the learning of the model through a data set including a plurality of data related to normality is completed. For example, when the learned model outputs information indicating that the anomaly is detected in the corresponding transformed data by processing transformed data (e.g., data to which transformation label is granted) which is data related to abnormality among the data included in the test data set as the input, the processor 110 may determine that anomaly detection performance of the corresponding model is appropriate. For example, when the model calculates an output (e.g., a correct answer rate) that the anomaly is detected for inputs of the plurality of transformed data at a predetermined ratio (e.g., 90%) or more, it may be determined that the performance of the corresponding model is appropriate. The concrete description of the determination of appropriateness of the model described above is just an example and the present disclosure is not limited thereto.

That is, it may be tested whether the detection performance of the corresponding model is appropriate according to a processing result of the model for a test data set including normal data and abnormal data generated based on the normal data in response to the time point when the learning of the model is completed.

The processor 110 may generate additional transformed data by performing transformation for data generated after the learning completion in response to the operation time of the model. The processor 110 may perform a test for whether the performance of the model deteriorates by calculating a test data set including the additional transformed data by using the model.

Specifically, data used for the learning of the model in the present disclosure may include various types of data acquired in an industrial site. For example, the data may include operating parameters of a device for producing a product in a production process of the product, sensor data acquired by an operation of the device, and the like. One datum may include data acquired while manufacturing a product by using one manufacturing recipe in one manufacturing equipment. The data acquired while manufacturing the product may include sensor data. In other words, a dataset including a plurality of data may include data acquired while manufacturing the product by using one or more manufacturing recipes in one or more manufacturing equipment (in other words, since data regarding multiple manufacturing equipment and multiple manufacturing recipes may coexist, the dataset may have a plurality of normal states), but each data may have one normal state as the data acquired in producing the product by one manufacturing recipe in each one manufacturing equipment. In this case, the manufacturing recipe may include information on a method for producing the product in the industrial field and specifically, include data for controlling the manufacturing equipment. However, setting of data for controlling the manufacturing equipment in the industrial site may be changed according to a change of a production process.

That is, at the time point after the learning of the model is completed, additional data other than a plurality of data related to learning may be acquired according to a setting change of the manufacturing recipe for the manufacturing equipment. In this case, since learning for input data after the setting change is not performed in a model learned at a time point when there is non-additional data, it may be difficult to appropriately determine anomaly detection during operating the model. That is, when generation of the additional data becomes active according to the setting change which occurs during operating the model, there is a concern that the performance degradation of the model learned through the existing data will occur. As a result, the processor 110 may generate additional transformed data by performing transformation for data generated after the learning completion in response to the operation time of the model. Further, the processor 110 may output whether the anomaly is detected for each of the plurality of test data included in the test data set by processing a test data set including additionally generated transformed data as the input of the model corresponding to the operating time point. For example, when the model corresponding to the operating time point outputs information indicating that the anomaly is detected in the corresponding transformed data by processing transformed data (e.g., data to which transformation label is granted) which is data related to abnormality among the data included in the test data set as the input, the processor 110 may determine that anomaly detection performance of the corresponding model is appropriate.

That is, it may be determined whether the deterioration performance of the corresponding model is appropriate according to a processing result of the model for a test data set including additionally acquired data (e.g., data related to normality) and transformed data generated based on the corresponding data in response to the operating time point of the model.

Therefore, the processor 110 may process a test data set including a plurality of data and a plurality of transformed data corresponding to the plurality of data as the input to the model in response to various time points (learning time point, learning completion time point, and operating time point) and perform the test for the performance of the model through the output anomaly detection result.

FIG. 4 is a schematic view illustrating a network function according to an embodiment of the present disclosure.

Throughout the present specification, a computation model, the neural network, a network function, and the neural network may be used as the same meaning. The neural network may be generally constituted by an aggregate of calculation units which are mutually connected to each other, which may be called node. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of the output node may be determined based on data input in the input node. Here, a node connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form the input node and output node relationship in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be configured to include one or more nodes. Some of the nodes constituting the neural network may constitute one layer based on the distances from the initial input node. For example, a set of nodes of which distance from the initial input node is n may constitute n layers. The distance from the initial input node may be defined by the minimum number of links through which should pass for reaching the corresponding node from the initial input node. However, definition of the layer is arbitrary for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean not the initial input node and the final output node but the nodes constituting the neural network. In the neural network according to an embodiment of the present disclosure, the number of nodes of the input layer may be the same as the number of nodes of the output layer, and the neural network may be a neural network of a type in which the number of nodes decreases and then, increases again from the input layer toward the hidden layer. Further, in the neural network according to another embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another embodiment of the present disclosure, the number of nodes of the input layer may be larger than the number of nodes of the output layer, and the neural network may be a neural network of a type in which the number of nodes increases from the input layer to the hidden layer. The neural network according to still yet another embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, potential structures of photos, text, video, voice, and music (e.g., what objects are in the picture, what the content and feelings of the text are, and what the content and feelings of the voice are) may be determined. The deep neural network may include a convolutional neural network, a recurrent neural network (RNN), an auto encoder, generative adversarial networks (GAN), a restricted Boltzmann machine (RBM), a deep belief network (DBN), a Q network, a U network, a Siam network, and the like. The description of the deep neural network described above is just an example and the present disclosure is not limited thereto.

In an embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be expanded symmetrical to reduction in number of nodes from the input layer to an intermediate layer called a bottleneck layer (encoding), and then reduction from the bottleneck layer to the output layer (symmetrical to the input layer). In this case, in the example of FIG. 3, it is illustrated that the dimension reduction layer and the dimension reconstruction layer are symmetric, but the present disclosure is not limited thereto and the nodes of the dimension reduction layer and the dimension reconstruction layer may or may not be symmetric. The auto encoder may perform non-linear dimensional reduction. The number of input and output layers may correspond to the number of sensors remaining after pre-processing the input data. The auto encoder structure may have a structure in which the number of nodes in the hidden layer included in the encoder decreases as a distance from the input layer increases. When the number of nodes in the bottleneck layer (a layer having a smallest number of nodes between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, and semi supervised learning. Learning of the neural network is to reduce or minimize errors in output. The learning of the neural network is a process of repeatedly inputting learning data into the neural network and calculating the output of the neural network for the learning data and the error of a target and back-propagating the errors of the neural network from the output layer of the neural network toward the input layer to reduce the errors to update the weight of each node of the neural network. In the case of the supervised learning, the learning data labeled with a correct answer is used for each learning data (e.g., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (e.g., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate to increase efficiency, and in a latter stage of the learning, the neural network uses a low learning rate to increase accuracy.

In learning of the neural network, the learning data may generally be a subset of actual data (e.g., data to be processed using the learned neural network) of actual data, and as a result, there may be a learning cycle in which errors for the learning data decrease, but the errors for the actual data increase. Overfitting is a phenomenon in which the errors for the actual data increase due to excessive learning of the learning data. For example, a phenomenon in which a neural network that learns a cat by showing a yellow cat does not recognize cats other than the yellow cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, etc., may be applied.

Disclosed is a computer readable medium storing the data structure according to an embodiment of the present disclosure.

The data structure may refer to the organization, management, and storage of data that enables efficient access to and modification of data. The data structure may refer to the organization of data for solving a specific problem (e.g., data search, data storage, and data modification in the shortest time). The data structures may be defined as physical or logical relationships between data elements, designed to support specific data processing functions. The logical relationship between data elements may include a connection relationship between data elements that the user thinks. The physical relationship between data elements may include an actual relationship between data elements physically stored on a computer-readable storage medium (e.g., hard disk). The data structure may specifically include a set of data, relationships between data, and functions or commands applicable to the data. Through an effectively designed data structure, a computing device can perform operations while using the resources of the computing device to a minimum. Specifically, the computing device can increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a manner that each data is connected in a row with a pointer. In the connection list, the pointer may include connection information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data arrangement structure that may access data limitedly and unlike a stack, the queue may be a data structure (FIFO-First in First Out) in which late stored data is output late. The deck may be a data structure capable of processing data at both ends of the data structure.

The nonlinear data structure may be a structure in which a plurality of data are connected after one data. The nonlinear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

Throughout the present specification, a computation model, the neural network, a network function, and the neural network may be used as the same meaning (hereinafter, the computation model, the neural network, the network function, and the neural network will be integrated and described as the neural network). The data structure may include the neural network. In addition, the data structures, including the neural network, may be stored in a computer readable medium. The data structure including the neural network may also include data input to the neural network, weights of the neural network, hyper parameters of the neural network, data obtained from the neural network, an active function associated with each node or layer of the neural network, and a loss function for learning the neural network. The data structure including the neural network may include predetermined components of the components disclosed above. In other words, the data structure including the neural network may include all of data input to the neural network, weights of the neural network, hyper parameters of the neural network, data obtained from the neural network, an active function associated with each node or layer of the neural network, and a loss function for training of the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called node. The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include weights of the neural network (weights and parameters may be used as the same meaning in the present disclosure). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the parameters set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Therefore, it is assumed that the above-described weights and/or combinations of respective weights are included in the data structure including the weights of the neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconstructed in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which is varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

FIG. 5 is a flowchart for performing a method for testing performance of a model according to an embodiment of the present disclosure.

According to an embodiment of the present disclosure, the computing device 100 may generate a plurality of modified data based on each of the plurality of data included in the data set (410).

According to an embodiment of the present disclosure, the computing device 100 may generate a test data set based on a plurality of data and a plurality of transformed data (420).

According to an embodiment of the present disclosure, the computing device 100 may test the performance of the model by calculating the test data set by using the model (430).

The steps of FIG. 5 described above may be changed in order as necessary, and at least one or more steps may be omitted or added. That is, the aforementioned steps are just an embodiment of the present disclosure and the scope of the present disclosure is not limited thereto.

FIG. 6 illustrates a logic for implementing a method for testing performance of a model according to an embodiment of the present disclosure.

According to an embodiment of the present disclosure, the computing device 100 may be implemented by the following logics.

According to an embodiment of the present disclosure, the computing device 100 may include a logic 510 for generating a plurality of transformed data based on each of a plurality of data included in a data set, a logic 520 for generating a test data set based on the plurality of data and the plurality of transformed data, and a logic 530 for testing performance a model by calculating the test data set by using the model.

Alternatively, the logic for generating the plurality of transformed data based on each of the plurality of data included in the data set may include a logic for generating the plurality of transformed data by transforming a part of each of the plurality of data.

Alternatively, the logic for generating the plurality of transformed data by transforming a part of each of the plurality of data may include a logic for selecting a plurality of different data from the data set and a logic for generating the plurality of transformed data by exchanging a value of one datum among the plurality of selected data and a value of another data at a predetermined degree.

Alternatively, the logic for generating the plurality of transformed data based on each of the plurality of data included in the data set may include a logic for generating the plurality of transformed data by processing the data set as an input of a pseudo anomaly generation model.

Alternatively, the logic for generating the plurality of transformed data by processing the data set as the input of the pseudo anomaly generation model may include a logic for calculating a first probability distribution and a first sample statistical amount for a first data set by using the first data set and a logic for training the pseudo anomaly generation model that learns a second probability distribution and a second sample statistical amount for a second data set, and the first data set and the second data set may be vectors or scalars for homogeneous data.

Alternatively, the logic for training the pseudo anomaly generation model may include a logic for calculating a similarity between the first probability distribution and the second probability distribution and a logic for determining whether to additionally perform the training of the pseudo anomaly generation model based on the similarity between the distributions.

Alternatively, the logic for training the pseudo anomaly generation model may further include a logic for granting a transformation label to each of the plurality of transformed data and a logic for generating a test data set including the plurality of transformed data to which the transformation label is granted, and the transformation label may include a description of each of the plurality of transformed data, and may include at least one of information related to a state of each of the plurality of transformed data or description information related to transformation of each of the plurality of transformed data.

Alternatively, the test data set may include one or more test data subsets, and each of the one or more test data subsets may be constituted by one or more data among a plurality of data included in the data subset of the same class and one or more transformed data among a plurality of transformed data generated based on each of the plurality of data included in the data subset of the same class.

Alternatively, the logic for training the pseudo anomaly generation model may further include a logic for performing evaluation for the test data set.

Alternatively, the logic for performing the evaluation for the test data set may include a logic for inputting each of the data included in the test data subset into the model and mapping the input data to a solution space and a logic for calculating suitability of the test data set based on the data included in the test data subset and a classification reference of the model.

Alternatively, the logic for testing the performance of the model by calculating the test data set by using the model may include a logic for testing the performance of the model based on whether the model determines that the plurality of transformed data included in the test data set are abnormal.

Alternatively, the logic for testing the performance of the model by calculating the test data set by using the model may be performed at at least one time point of learning completion of the model or an operation of the model during learning of the model.

Alternatively, the logic for testing the performance of the model by calculating the test data set by using the model may include a logic for testing learning performance of the model by calculating a first test data set by using the model at a predetermined epoch interval in response to a learning time point of the model, a logic for testing detection performance of the model by calculating the first test data set by using the model in response to a learning completion time point of the model, and a logic for performing testing for performance degradation of the model by calculating a second test data set by using the model in response to an operation time point of the model.

Alternatively, the first test data set includes first test data subsets configured in different classes, respectively acquired in response to a first time point, and the first test data subset may be constituted by data of one class and transformed data generated based on the data of one class.

Alternatively, the second test data set may include data additionally acquired in response to a second time point which is a time point after the first time point and a second test data subset constituted by transformed data for the data, and the second time point may be a time point corresponding to the operation time point of the model.

Alternatively, the logic for performing the testing for the performance degradation of the model by calculating the second test data set by using the model in response to the operation time point of the model may be performed based on whether the model determines that the transformed data included in the second test data subset is abnormal.

Alternatively, the logic for performing the testing for the performance degradation of the model by calculating the second test data set by using the model in response to the operation time point of the model may further include a logic for determining that the performance degradation of the model occurs when the model determines that the transformed data included in the second test data subset is normal or a logic for determining that the performance degradation of the model does not occur when the model determines that the transformed data included in the second test data subset is abnormal.

According to an embodiment of the present disclosure, a logic for implementing the computing device 100 may be implemented by a means, a circuit, or a module for implementing a computing program.

Those skilled in the art need to recognize that various illustrative logical blocks, configurations, modules, circuits, means, logic, and algorithm steps described in connection with the embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application, but such implementation decisions should not be interpreted as causing a departure from the scope of the present disclosure.

FIG. 7 is a simple and general schematic view of a computing environment in which embodiments of the present disclosure may be implemented.

The present disclosure has generally been described above in association with a computer executable instruction which may be executed on one or more computers, but it will be well appreciated by those skilled in the art that the present disclosure can be implemented through a combination with other program modules and/or a combination of hardware and software.

In general, the program module includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices, as well as a single-processor or multi-processor computer system, a mini computer, and a main frame computer.

The embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Any medium accessible by a computer may be a computer readable medium, and the computer readable medium may include a computer readable storage medium and a computer readable transmission medium. The computer readable storage medium includes volatile and non-volatile media and movable and non-movable media. The computer readable storage media include volatile and non-volatile media and movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally include information transfer media that implement the computer readable command, the data structure, the program module, or other data in a carrier wave or a modulated data signal such as other transport mechanism. The term "modulated data signal" means a signal acquired by configuring or changing at least one of characteristics of the signal so as to encode information in the signal. As a non-limiting example, the computer readable transmission media include wired media such as a wired network or a direct-wired connection and wireless media such as acoustic, RF, infrared, and other wireless media. A combination of any media among the aforementioned media is also included in a range of the computer readable transmission media.

An environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer (s) 1148 may be a workstation, a server computer, a router, a personal computer, a portable computer, a micro-processor-based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158, be connected to a communication server on the WAN 1154, or have other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other, to the Internet, and to the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It may be appreciated by those skilled in the art that various logical blocks, modules, processors, means, circuits, and algorithm steps described in association with the embodiments disclosed herein may be implemented by electronic hardware, various types of programs or design codes (for easy description, herein, designated as "software"), or a combination of all of them. In order to clearly describe the intercompatibility of the hardware and the software, various components, blocks, modules, circuits, and steps have been generally described above in association with functions thereof. Whether the functions are implemented as hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, an apparatus, or a standard programming and/or engineering technique. The term "manufactured article" includes a computer program, a carrier, or a medium which is accessible by a predetermined computer readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" includes a wireless channel and various other media that can store, possess, and/or transfer instruction(s) and/or data, but is not limited thereto.

It will be appreciated that a specific order or a hierarchical structure of steps in the presented processes is one example of accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be analyzed within the widest range which is coherent with the principles and new features presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A non-transitory computer-readable medium including a computer program, wherein when the computer program is executed by one or more processors, the computer program allows the one or more processors to perform a method for testing performance of a model, the method comprising:
   generating a plurality of transformed data by processing at least one data set among data sets including a plurality of data as an input of a pseudo anomaly generation model, wherein the pseudo anomaly generation model is trained by calculating an inter-distribution similarity between a first probability distribution and a second probability distribution, and determining whether to additionally perform a training of the pseudo anomaly generation model based on the inter-distribution similarity;
   generating a test data set based on the plurality of data and the plurality of transformed data; and
   testing the performance of the model by calculating the test data set by using the model,
   wherein the generating the plurality of transformed data by processing the data set as the input of the pseudo anomaly generation model includes:
      calculating the first probability distribution and a first sample statistical amount for a first data set by using the first data set, and
      calculating the second probability distribution and a second sample statistical amount for a second data set,
   wherein the first data set and the second data set are vectors or scalars for homogenous data.

2. The non-transitory computer-readable medium of claim 1, wherein the generating the plurality of transformed data based on each of the plurality of data included in the data set includes generating the plurality of transformed data by transforming a part of each of the plurality of data.

3. The non-transitory computer-readable medium of claim 2, wherein the generating the plurality of transformed data by transforming a part of each of the plurality of data includes:
   selecting a plurality of different data in the data set, and
   generating the plurality of transformed data, by exchanging a value of one data and a value of another data among the plurality of selected data at a predetermined degree.

4. The non-transitory computer-readable medium of claim 1, the method further comprising:
   assigning a transformation label to each of the plurality of transformed data; and
   generating a test data set including the plurality of transformed data to which the transformation label is assigned,
   wherein the transformation label includes a description of each of the plurality of transformed data, and wherein the transformation label further includes at least one of information related to a state of each of the plurality of transformed data or description information related to transformation of each of the plurality of transformed data.

5. The non-transitory computer-readable medium of claim 1, wherein:
the test data set includes one or more test data subsets, and
each of the one or more test data subsets is constituted by one or more data among a plurality of data included in the data subset of the same class and one or more transformed data among a plurality of transformed data generated based on each of the plurality of data included in the data subset of the same class.

6. The non-transitory computer-readable medium of claim 1, the method further comprising:
performing evaluation for the test data set.

7. The non-transitory computer-readable medium of claim 6, wherein the performing the evaluation for the test data set includes
inputting each of the data included in the test data subset into the model and mapping the input data to a solution space, and
calculating suitability of the test data set based on the data included in the test data subset and a classification reference of the model.

8. The non-transitory computer-readable medium of claim 1, wherein the testing the performance of the model by calculating the test data set by using the model includes testing the performance of the model based on whether the model determines that the plurality of transformed data included in the test data set is abnormal.

9. The non-transitory computer-readable medium of claim 1, wherein the testing the performance of the model by calculating the test data set by using the model is performed at least one time point of learning completion of the model or an operation of the model during learning of the model.

10. The non-transitory computer-readable medium of claim 1, wherein the testing the performance of the model by calculating the test data set by using the model includes:
testing learning performance of the model by calculating a first test data set by using the model at a predetermined epoch interval in response to a learning time point of the model,
testing detection performance of the model by calculating the first test data set by using the model in response to a learning completion time point of the model, and
performing testing for performance degradation of the model by calculating a second test data set by using the model in response to an operation time point of the model.

11. The non-transitory computer-readable medium of claim 10, wherein:
the first test data set includes first test data subsets configured in different classes, respectively acquired in response to a first time point, and
the first test data subset is constituted by data of one class and transformed data generated based on the data of one class.

12. The non-transitory computer-readable medium of claim 10, wherein:
the second test data set includes data additionally acquired in response to a second time point which is a time point after the first time point and a second test data subset constituted by transformed data for the data, and
the second time point is a time point corresponding to the operation time point of the model.

13. The non-transitory computer-readable medium of claim 12, wherein the performing the testing for the performance degradation of the model by calculating the second test data set by using the model in response to the operation time point of the model is performed based on whether the model determines that the transformed data included in the second test data subset is abnormal.

14. The non-transitory computer-readable medium of claim 13, the method further comprising:
determining that the performance degradation of the model occurs when the model determines that the transformed data included in the second test data subset is normal; or
determining that the performance degradation of the model does not occur when the model determines that the transformed data included in the second test data subset is abnormal.

15. A computing device for testing performance of a model, comprising:
a processor including one or more cores;
a memory including program codes executable in the processor; and
a network unit transceiving data with another computing device,
wherein the processor adapted to:
generate a plurality of transformed data by processing at least one data set among data sets including a plurality of data as an input of a pseudo anomaly generation model, wherein the pseudo anomaly generation model is trained by calculating an inter-distribution similarity between a first probability distribution and a second probability distribution, and determining whether to additionally perform a training of the pseudo anomaly generation model based on the inter-distribution similarity;
generate a test data set based on the plurality of data and the plurality of transformed data; and
test the performance of the model by calculating the test data set by using the model,
wherein the generating the plurality of transformed data by processing the data set as the input of the pseudo anomaly generation model includes:
calculating the first probability distribution and a first sample statistical amount for a first data set by using the first data set, and
calculating the second probability distribution and a second sample statistical amount for a second data set,
wherein the first data set and the second data set are vectors or scalars for homogenous data.

16. A non-transitory computer readable medium storing a data structure corresponding to a parameter of a neural network at least partially updated in a learning process, wherein operations of the neural network are based on at least partially the parameter, and the learning process comprises:
generating a plurality of transformed data by processing at least one data set among data sets including a plurality of data as an input of a pseudo anomaly generation model, wherein the pseudo anomaly generation model is trained by calculating an inter-distribution similarity between a first probability distribution and a second probability distribution, and determining whether to additionally perform a training of the pseudo anomaly generation model based on the inter-distribution similarity;

generating a test data set based on the plurality of data and the plurality of transformed data; and testing the performance of a model by calculating the test data set by using the model, wherein the generating the plurality of transformed data by processing the data set as the input of the pseudo anomaly generation model includes:

calculating the first probability distribution and a first sample statistical amount for a first data set by using the first data set, and calculating the second probability distribution and a second sample statistical amount for a second data set, wherein the first data set and the second data set are vectors or scalars for homogenous data.

* * * * *